United States Patent Office 3,305,310
Patented Feb. 21, 1967

3,305,310
METHOD OF STABILIZING SODIUM PEROXIDE OCTAHYDRATE CRYSTALS
Dale L. Schechter and James J. Leddy, Midland, Mich., assignors to The Dow Chemical Company, Midland, Mich., a corporation of Delaware
No Drawing. Filed Jan. 2, 1964, Ser. No. 335,419
3 Claims. (Cl. 23—184)

This invention relates to the stabilization of crystalline materials and more particularly relates to a novel method of stabilizing crystals of sodium peroxide octahydrate.

Various materials which are intrinsically unstable tend to decompose over varying periods of time. For example, though ordinary commercial grade anhydrous sodium peroxide is quite stable, the impure octahydrate thereof tends to be quite unstable, decomposing in one case, as will be hereinafter shown, at a rate with respect to peroxygen loss of about 18 percent per month. Such decomposition is, in addition to being undesirable, economically detrimental. A method, therefore, whereby this detrimental decomposition of such unstable crystals could be eliminated would be highly desirable in the art.

A principal object of the present invention, therefore, is to provide a novel method whereby decomposition of unstable crystals can be minimized.

A further object is to provide a novel method of stabilizing crystals of sodium peroxide octahydrate to essentially eliminate decomposition and peroxygen value loss of said hydrate upon standing or being stored.

The term "unstable" as used herein refers to the phenomenon of chemical degradation or change in structure of a crystalline material. Accordingly, the terms "stabilize" or "stabilizing" as used herein refer to the maintenance of a given crystalline material in a form wherein it does not undergo detrimental autochemical reaction or degradation.

In general, the present invention comprises, and the above objects and advantages are realized, by contacting the crystals to be treated, as for example, by dusting, with a stabilizing agent such as magnesium sulfate in an effective amount to inhibit decomposition on the crystal surface, it having been unexpectedly discovered that significant decomposition, for example, of sodium peroxide octahydrate crystals apparently takes place essentially due to an aqueous surface film of uncombined water on said crystals and to trace quantities of heavy metal ions in the crystal, such as iron, mercury, and copper, which catalyzes such decomposition. Therefore, by removing said uncombined water and inhibiting the catalytic effect of said ions in accordance with the present invention, stability of the crystals is markedly increased. The crystals to be treated under the present invention, therefore, are those which tend to be unstable due primarily to the catalytic effect of heavy metal ions in combination with the presence of uncombined water on the crystal surface. The term "surface water" as used herein refers to uncombined water which may be present on the surface of the crystals to be treated, as opposed to any combined water of hydration that may be present in the crystal lattice. Any particular theory or mechanism of operation herein made, however, is not to be construed or intended to be binding and is merely an explanation relative to the basis on which the present invention rests.

After the crystals to be stabilized have been treated, they are, if not used immediately, ordinarily placed in an air tight container for storage and subsequent use. Preferably, the crystals should be dusted or treated with a stabilizing agent selected from the group of salts consisting of magnesium sulfate ($MgSO_4$), magnesium oxide ($MgO$), magnesium pyrophosphate ($Mg_2P_2O_7$), sodium stannate ($Na_2Sn(OH)_6$) and mixtures thereof in an effective amount by weight sufficient to cover the surface of said crystals and to obtain the maximum crystal stability possible. In addition, calcium sulfate having about ½ molecule water of hydration per molecule ($CaSO_4 \cdot \frac{1}{2}H_2O$), magnesium nitrate ($Mg(NO_3)_2$), magnesium acetate ($Mg(C_2H_3O_2)_2$), 8-quinolinol, hexamine and calcium peroxide octahydrate ($CaO_2 \cdot 8H_2O$) may also be used. Generally, the agent is applied to the crystals in an amount by weight within the range of from about 0.05% to about 5%. Though amounts greater than this may be applied no particular advantage results in doing so.

In general, the stabilizing agent employed must be one which is not reactive with the crystals being treated or the impurities therein, does not contain ions such as copper which will act as positive catalysts to decompose the crystals, and have a stabilizing effect sufficient to remove from the crystal surface enough uncombined water and/or to "chelate" impurity ions in said surface film to attain maximum crystal stability. In the case of sodium peroxide octahydrate this is normally accomplished at least in part by reducing the surface water, which may exist thereon as a saturated solution of the octahydrate, to a level of about 0.5 mg. of water per gram of crystals, or, by inhibiting or chelating the catalytic effect of the impurity ions therein.

Application of the stabilizing agent of the present invention may be accomplished by tumbling the crystals in a rotary drum or by any other dusting means suitable to obtain good coverage on the crystal surface. The crystals themselves, however, should preferably be relatively large in size, rather than exceedingly fine powders or dusts. For example, particles having a nominal size of from about 100 to about 3,000 microns are desirable. A particularly convenient way which has been found to apply the stabilizing agent to the crystals is by spraying, for example, washed crystals of sodium peroxide octahydrate with 0.1% by weight of magnesium sulfate (based on the weight of crystals treated) dissolved in a small amount of water, or an effective amount of one of the other stabilizing agents, and thereafter drying with dry air for about 1 hour. Washing the crystals prior to the spraying is accomplished merely by rinsing the crystals with, for example, water at 0° C.

It is manifest in carrying out the present invention that stabilizing agents other than those aforesaid, such as, for example, talc, calcium chloride ($CaCl_2$), silica gel, boron oxide ($B_2O_3$), and sodium tetraborate dihydrate ($Na_2B_4O_7 \cdot 2H_2O$) may possibly be used, depending on how strong a desiccating action the crystals to be treated can withstand and need without loss, for example, of water of hydration when hydrates are treated.

The following examples serve to more fully illustrate the present invention but are not intended to be limited thereto:

Various batches of sodium peroxide octahydrate crystals were prepared each varying in crystal size and in the amount of impurity present. A control sample from each batch was then placed in a decomposimeter comprising an ampoule of known volume connected to a capillary monometer, and immersed in a constant temperature bath of 26° C., whereupon, the daily change in pressure due to oxygen liberation was observed until a definite pressure change pattern was established. The results were calculated as to decomposition per month and recorded in Table I. A control now having been established for each batch, several small samples were obtained from each said batch and treated by dusting with an amount of a different stabilizing agent as indicated in Table I. Each sample so treated was similarly placed in a decomposimeter and immersed in a constant temperature bath (26° C.) and the percent per month of decomposition calculated. For each sample (indicated as examples in the table) the comparative decomposition rates with the control were obtained. In every case, the decomposition of the treated sample of crystals from each batch was markedly and dramatically reduced from that of the control for each particular batch. These examples clearly illustrate the reduction in decomposition of crystals when treated in accordance with the process of the present invention by removing the surface water on the crystals and inhibiting catalytic decomposition by adding a stabilizing agent to the crystal.

TABLE I

| Example | Batch | Agent | Grade of Agent | Amount Used, Wt. Percent | Decomposition Rate Percent per Month |
|---|---|---|---|---|---|
| Control | A | | | | 16.0 |
| (1) | A | $MgSO_4$ | | 3.6 | 3.7 |
| Control | B | | | | 42.3 |
| (2) | B | $MgSO_4$ | Reagent | 4.45 | 6.7 |
| Control | C | | | | 20.28 |
| (3) | C | $Mg_2P_2O_7$ | Technical | 2.46 | 7.47 |
| Control | D | | | | 60.3 |
| (4) | D | $MgSO_4$ | Reagent | 1.29 | 6.97 |
| (5) | D | $CaSO_4 \cdot 1/2H_2O$ | | 1.86 | 28.00 |
| (6) | D | $Zn(C_2H_3O_2)_2$ | Reagent | 2.68 | 23.0 |
| (7) | D | $Na_2Sn(OH)_6 + Mg_2P_2O_7$ | | 1.42 | 7.68 |
| Control | E | | | | 18.1 |
| (8) | E | $Mg(NO_3)_2$ | Reagent | 3.8 | 6.12 |
| (9) | E | $Na_2SiO_3$ | do | 2.13 | 3.84 |
| (10) | E | $MgO$ | do | 3.09 | 2.1 |
| (11) | E | $Mg(C_2H_3O_2)_2$ | ACS | 3.77 | 5.19 |
| Control | F | | | | 21.7 |
| (12) | F | $CaO_2 \cdot 8H_2O$ | | 1.75 | 4.74 |
| (13) | F | $MgO$ | Reagent | 1.45 | 2.2 |
| Control | G | | | | 15.0 |
| (14) | G | 8-Quinolinol | | 1.41 | 4.5 |
| (15) | G | Hexamine | | 1.25 | 2.2 |

To illustrate the use of magnesium sulfate as a stabilizer applied by the convenient method aforesaid, 50 grams of $Na_2O_2 \cdot 8H_2O$ were placed in a basket centrifuge and sprayed while being spun with about 30 cc. of water at 0° C. and immediately thereafter with about 5 cc. of an aqueous solution containing 0.1% by weight $MgSO_4$ using an atomizer. The crystals were then removed and dried with dry air (having a dew point of 10° C.) for an hour. Upon being placed in a decomposimeter the octahydrate crystals so treated showed a decomposition rate of 2.98% per month, whereas, a similar sample of crystals from the same source not so treated exhibited a decomposition rate of 26.9% per month.

It is manifest that various modifications and changes can be made to the process of the present invention without departing from the spirit or scope thereof and it is understood that we limit ourselves only as defined in the claims as appended hereto.

We claim:
1. A method of stabilizing sodium peroxide octahydrate crystals containing uncombined surface water and catalytic impurities which comprises, contacting said octahydrate crystals with a stabilizing agent in an amount of from about 0.05 percent to about 5.0 percent based on the weight of the crystals to be treated, said agent being selected from the group consisting of magnesium sulfate ($MgSO_4$), magnesium oxide ($MgO$), magnesium pyrophosphate ($Mg_2P_2O_7$), sodium stannate ($Na_2Sn(OH)_6$), magnesium acetate ($Mg(C_2H_3O_2)_2$), magnesium nitrate ($Mg(NO_3)_2$), and calcium peroxide octahydrate

$$CaO_2 \cdot 8H_2O$$

2. The method of claim 1 wherein the stabilizing agent selected is magnesium sulfate.

3. The method of claim 1 wherein the stabilizing agent selected is magnesium oxide.

References Cited by the Examiner

UNITED STATES PATENTS

| | | | |
|---|---|---|---|
| Re. 18,907 | 8/1933 | Warning et al. | 23—89 X |
| 462,730 | 11/1891 | Ongley | 23—89 X |
| 1,140,995 | 5/1915 | Miller | 23—89 X |
| 1,987,059 | 1/1935 | Goerner | 23—184 X |
| 2,155,704 | 4/1939 | Goodall | 23—184 X |
| 2,170,052 | 8/1939 | Heim et al. | 23—184 X |
| 2,539,012 | 1/1951 | Diamond et al. | 23—89 X |
| 2,852,341 | 9/1958 | Bell et al. | 23—89 X |
| 2,854,341 | 9/1958 | Waldo | 23—89 |
| 3,053,633 | 9/1962 | Dunlop et al. | 23—184 X |
| 3,119,665 | 1/1964 | Hashman et al. | 23—89 X |
| 3,152,863 | 10/1964 | Saunders | 23—89 |
| 3,156,528 | 11/1964 | Moyer | 23—184 |

OSCAR R. VERTIZ, *Primary Examiner.*

EDWARD STERN, *Assistant Examiner.*